United States Patent [19]

Hall

[11] Patent Number: 5,672,233

[45] Date of Patent: Sep. 30, 1997

[54] APPARATUS FOR FORMING HOLLOW TUBE FLEXIBLE TAPE

[76] Inventor: Richard D. Hall, 3912 Pine Rail Cir., Valdosta, Ga. 31602

[21] Appl. No.: 569,571

[22] Filed: Dec. 8, 1995

Related U.S. Application Data

[63] Continuation-in-part of Ser. No. 413,351, Mar. 30, 1995, abandoned.

[51] Int. Cl.[6] ............................. B29D 23/00; B32B 1/00
[52] U.S. Cl. ...................... 156/466; 156/203; 156/391; 156/459; 156/461; 156/510; 156/538; 156/555
[58] Field of Search ....................... 156/203, 218, 156/466, 391, 459, 461, 510, 538, 555; 493/276, 277, 278, 279, 280; 228/129, 130; 112/63; 72/51

[56] References Cited

U.S. PATENT DOCUMENTS

| | | | |
|---|---|---|---|
| 1,892,629 | 12/1932 | Pfeiffer | 156/218 |
| 2,347,901 | 5/1944 | Gardner et al. | 493/276 |
| 2,592,766 | 4/1952 | Tincher . | |
| 3,482,491 | 12/1969 | Gustafson | 493/276 |
| 3,485,147 | 12/1969 | Hurst . | |
| 3,747,483 | 7/1973 | Hurst . | |
| 3,969,180 | 7/1976 | Raveslott . | |
| 4,201,799 | 5/1980 | Stephens . | |
| 4,202,288 | 5/1980 | Davy, Jr. . | |
| 4,341,828 | 7/1982 | Stephens . | |
| 4,525,235 | 6/1985 | Todisco . | |
| 4,996,941 | 3/1991 | Mills . | |
| 5,128,176 | 7/1992 | Schmidt . | |
| 5,137,752 | 8/1992 | Mills . | |
| 5,376,202 | 12/1994 | Maresh | 156/203 |

*Primary Examiner*—Richard Crispino
*Attorney, Agent, or Firm*—Hinkle & Associates, P.C.

[57] ABSTRACT

A tube-tape-forming apparatus having a tube-forming base (1, 41) with a half-fold means (5, 46) on a feed end (2, 42), a full-fold means (7, 48) on a cut-off end (3, 43) and a transition-fold means (6, 47) intermediate the half-fold means and the full-fold means. The half-fold means are guides (8, 11, 14, 15, 49, 52) which fold single-side-adhesion tape (26) in half linearly with nonadhesive sides (30) in contact. The transition-fold means brings opposite sides of folded tape towards each other selectively to form variously loop-folding with overlap of sides of the tape. The full-fold means are guides (19, 21, 23, 71, 88) which press the overlapped sides of the folded tape together in adhesive relationship to form variously circumferential (31) or flattened (32) linear-seam tube tape that can be used in flattened form or hand-inflated to be used in tubular form. The transition-fold means and the guides can be provided with rollers (33, 91). A tape dispenser (27, 92) at the feed end and a cut-off blade (25, 95) at the cut-off end can be provided in accordance with use conditions.

31 Claims, 8 Drawing Sheets

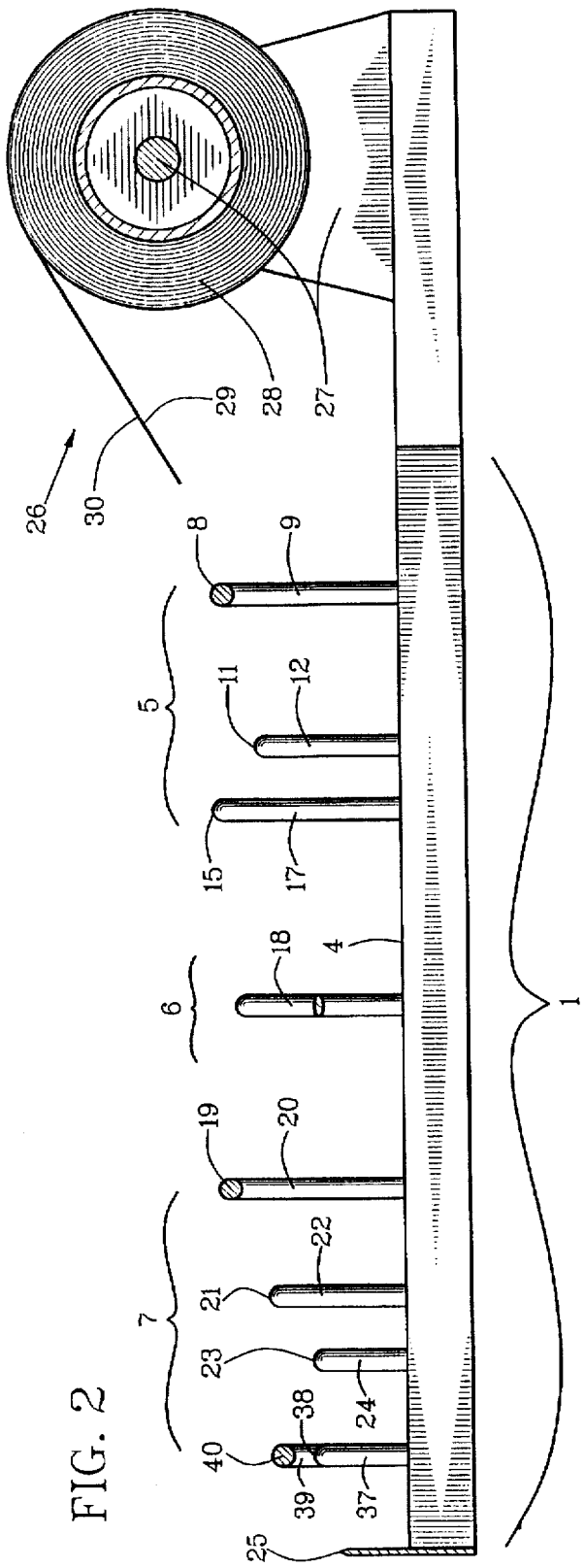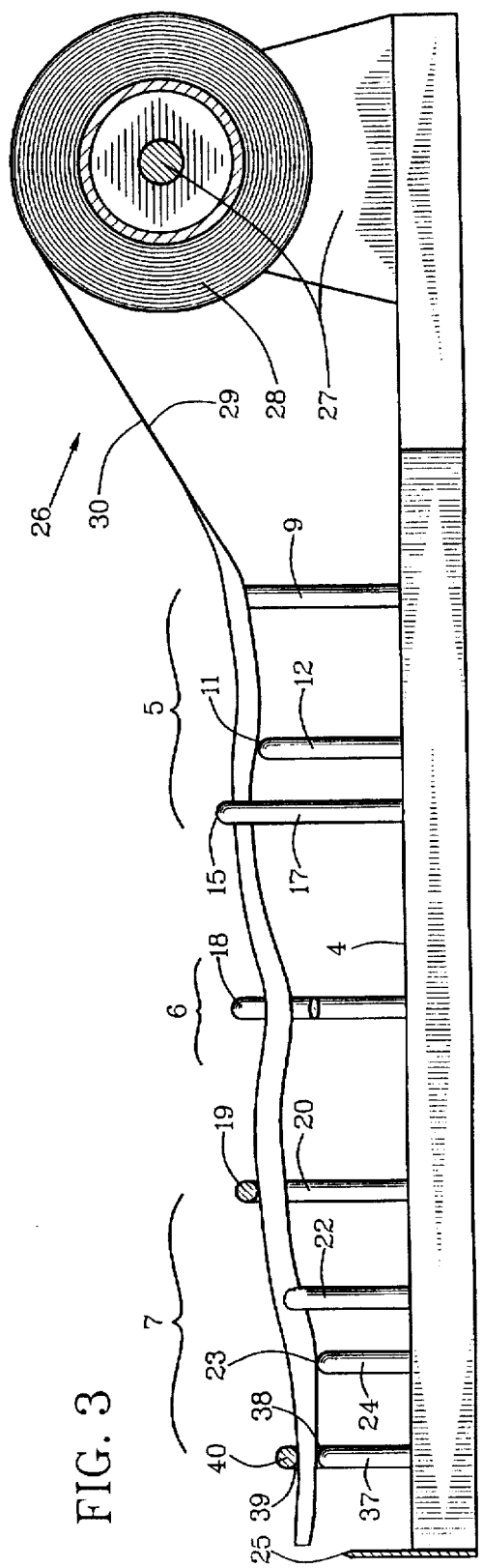

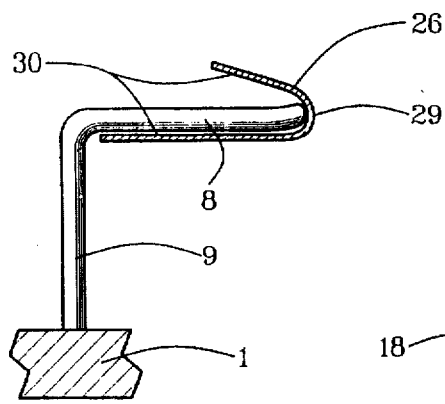
FIG. 4
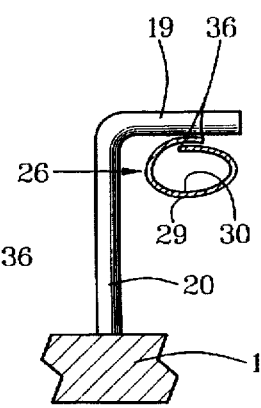
FIG. 8
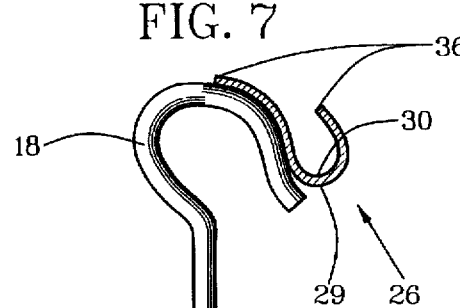
FIG. 7
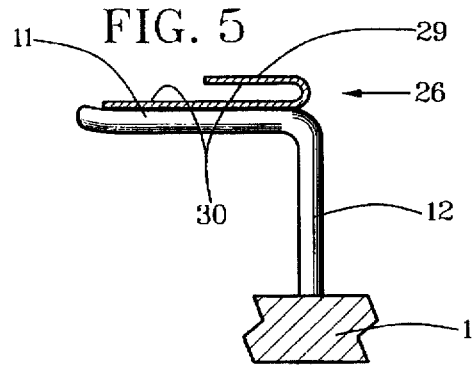
FIG. 5
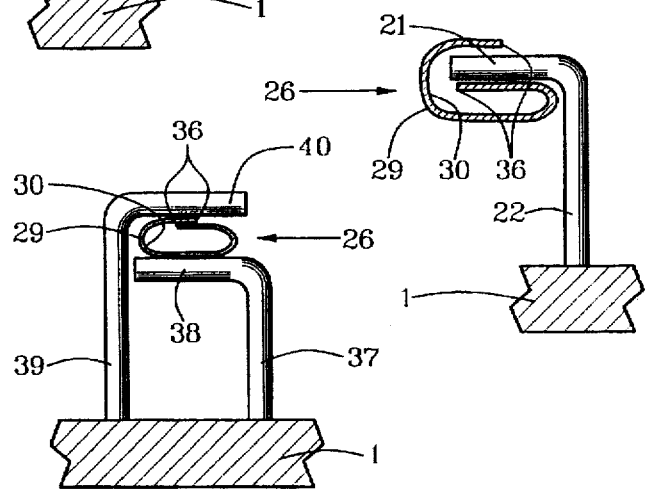
FIG. 9
FIG. 11
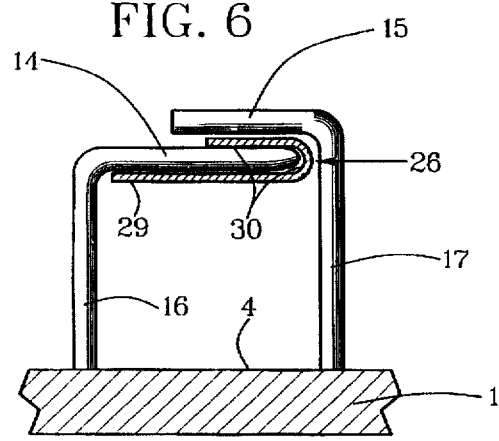
FIG. 6
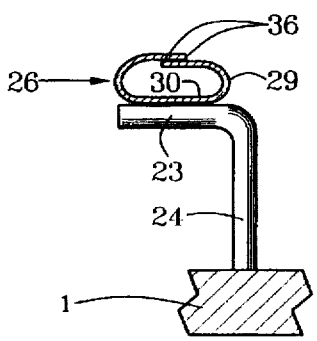
FIG. 10

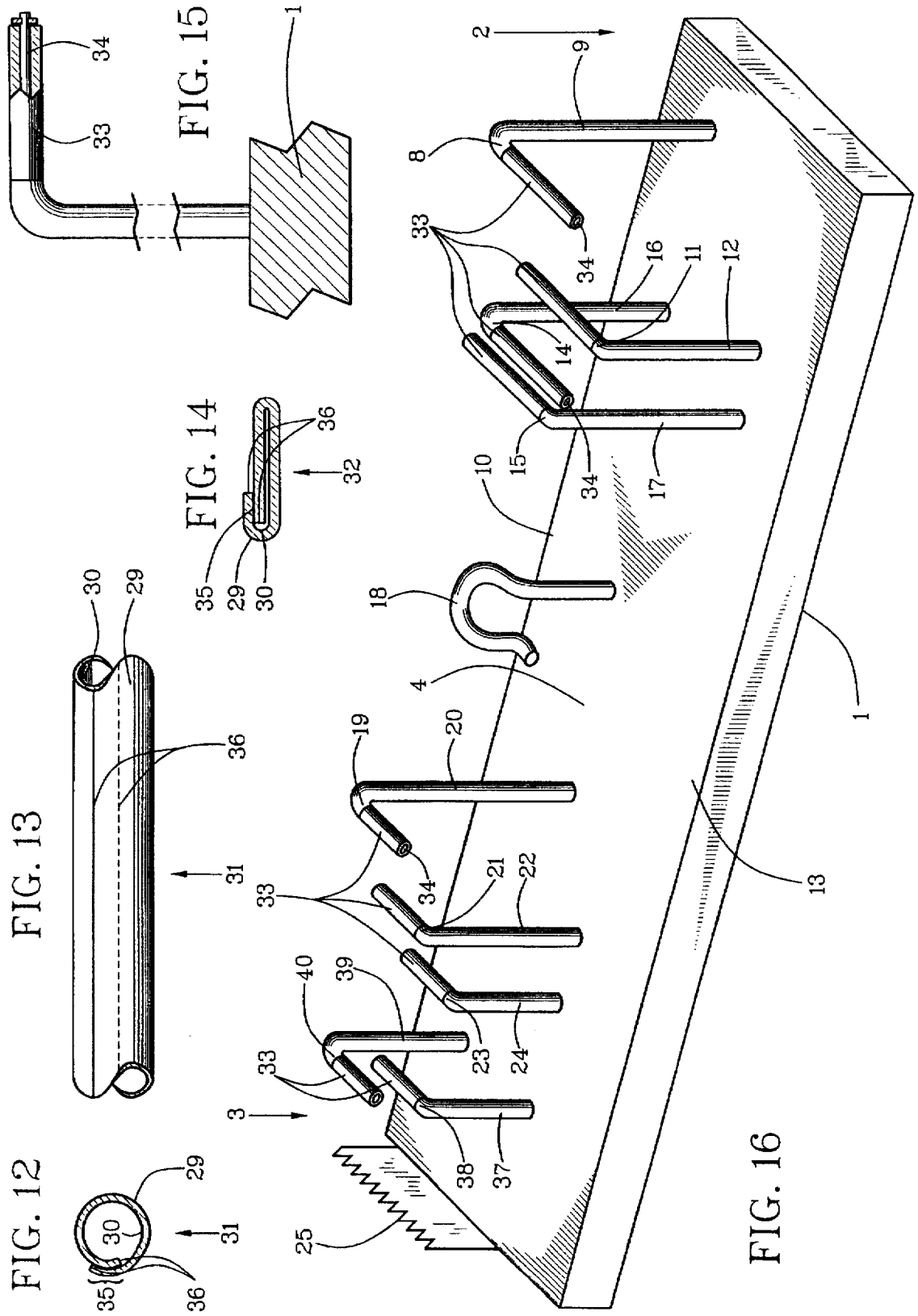

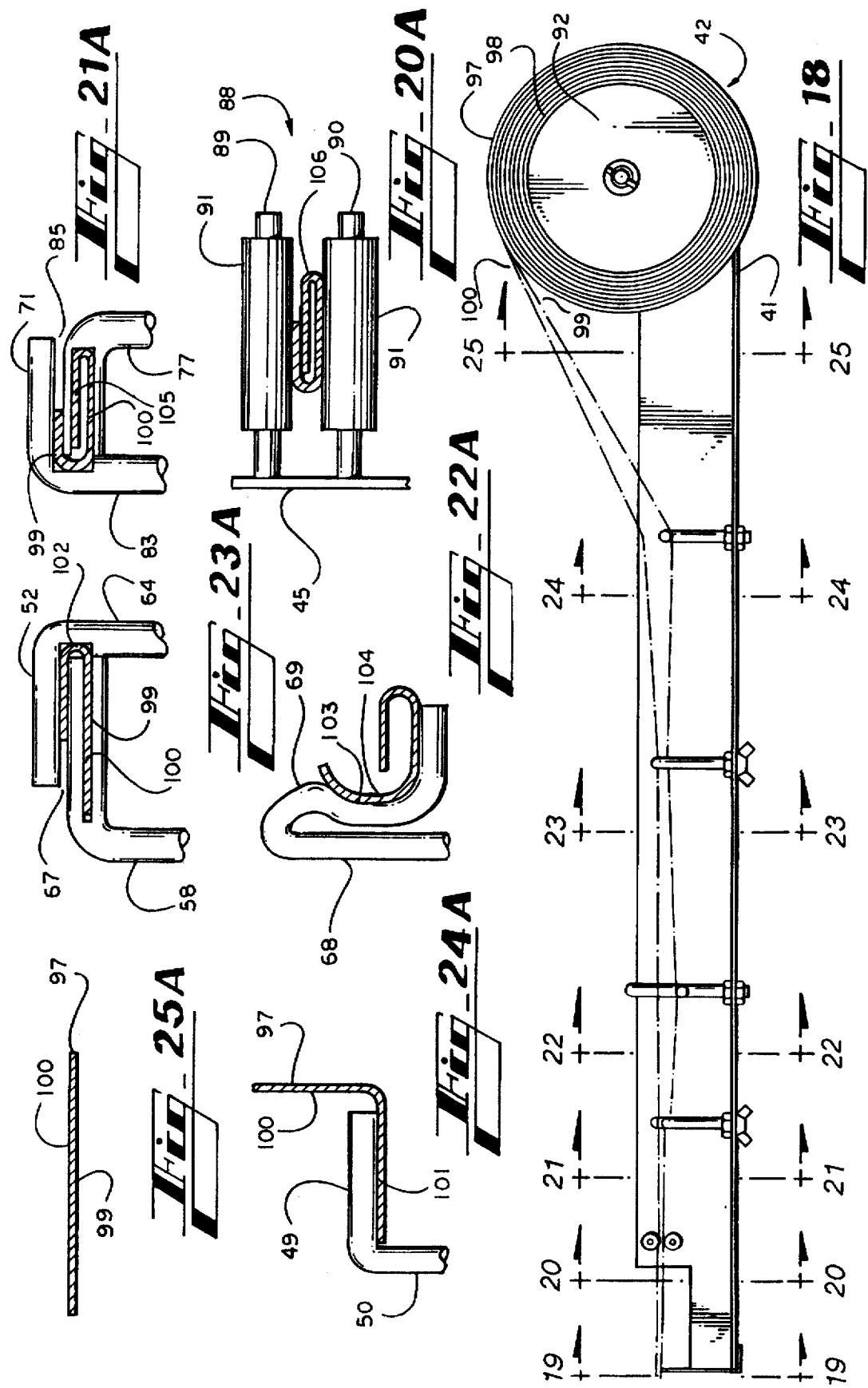

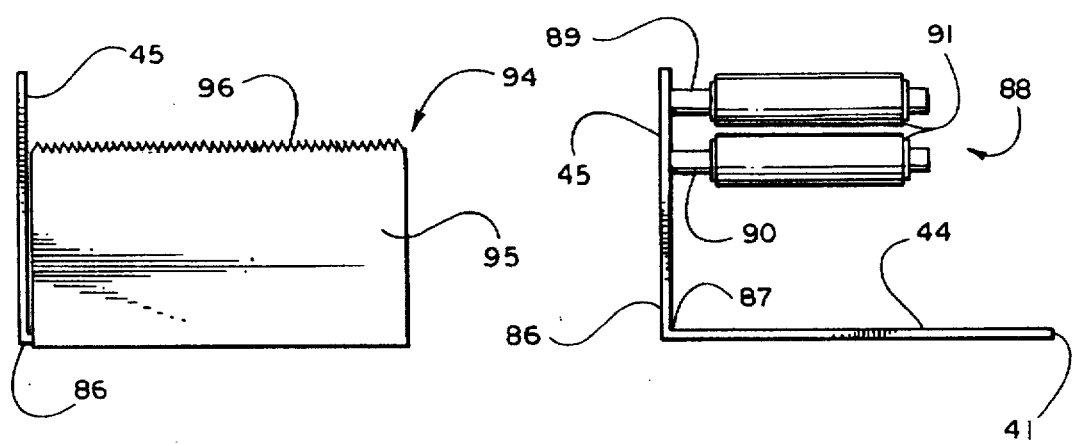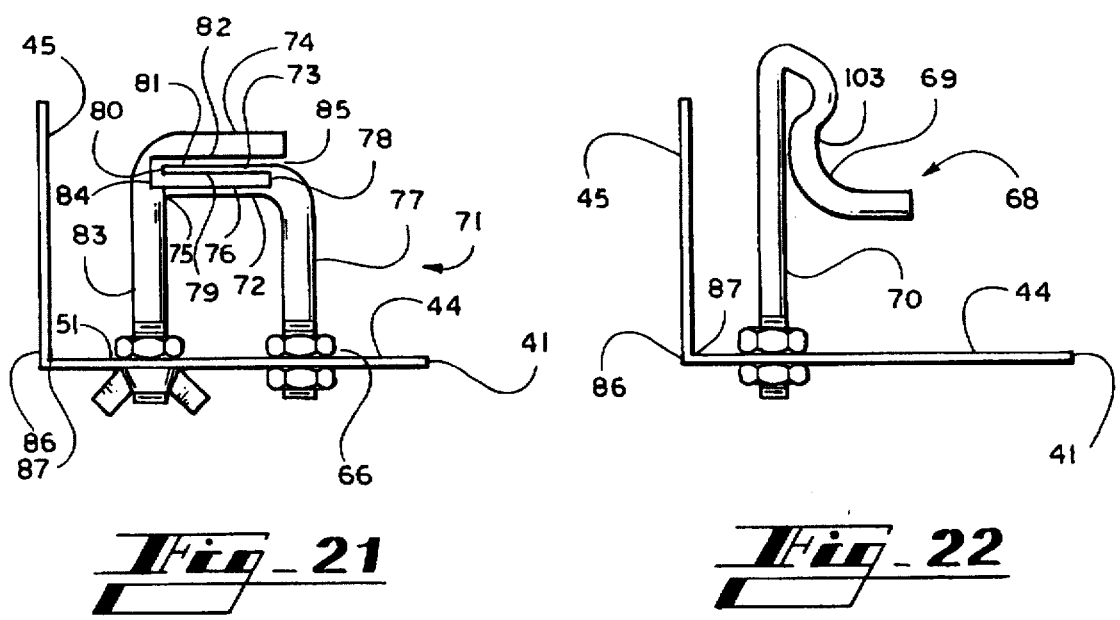

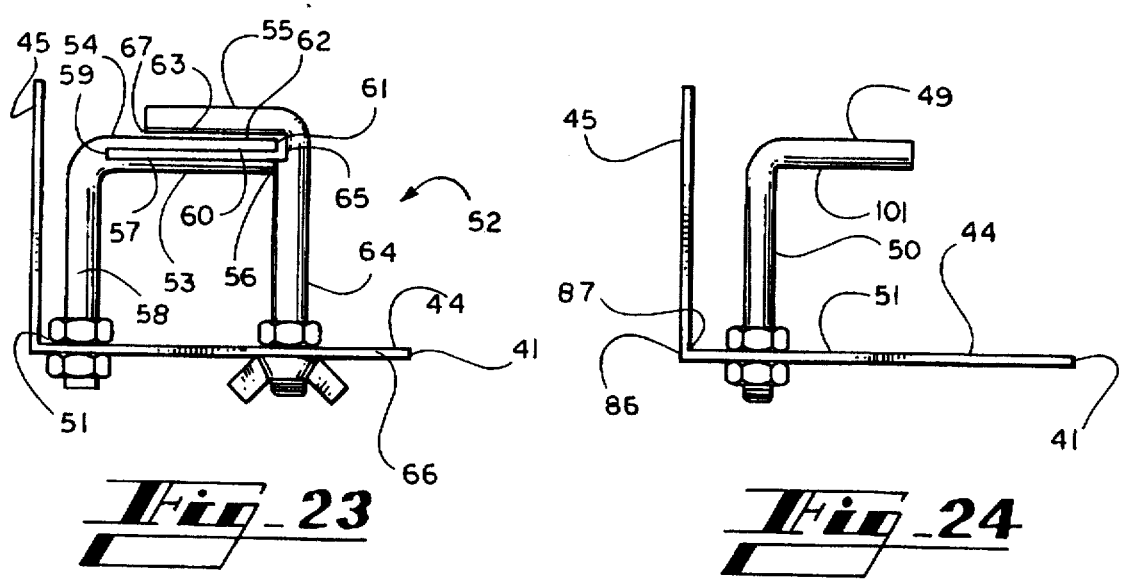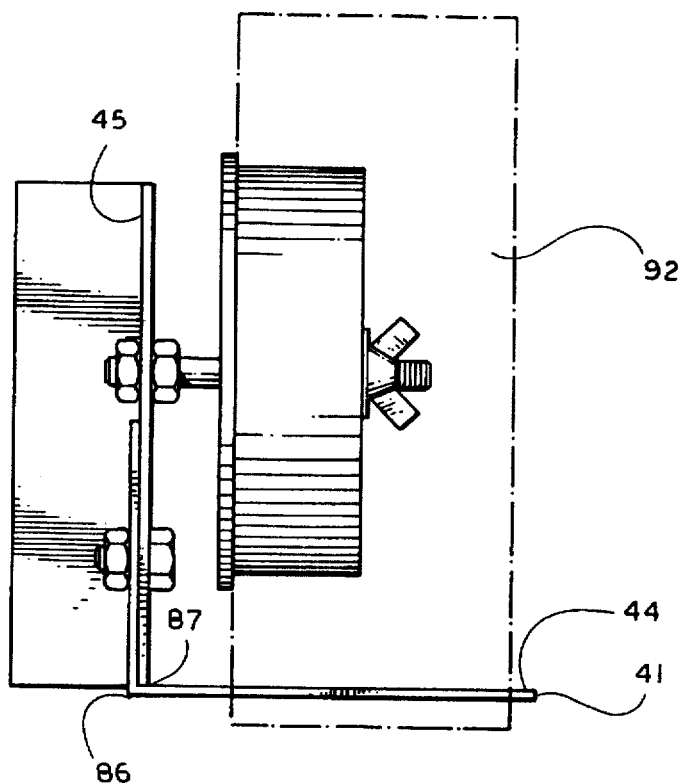

APPARATUS FOR FORMING HOLLOW TUBE FLEXIBLE TAPE

RELATED PATENT DOCUMENTS

This is a Continuation-In-Part of U.S. application Ser. No. 08/413,351 filed Mar. 30, 1995, now abandoned, by Richard D. Hall, entitled "Means And Method For Forming Hollow Tube Flexible Tape".

BACKGROUND OF THE INVENTION

I. Field of the Invention

The present invention relates generally to the field of forming flexible tape with adhesive on one side into flexible tubular tape with adhesive on a circumferential outside periphery. An adhesive side of flexible tape becomes an outside surface of a tape tube and a non-adhesive side of the flexible tape becomes an inside surface of the tape tube with a linear-overlap seam.

II. Description of the Related Art

Flexible-tape tubing has been constructed from single-side-adhesion tape previously with helical-overlap seams. None is known and no means or method are known for producing flexible-tape tubing with outside adhesion and a linear-overlap seam from single-side adhesion tape. Helical seams of known flexible-tape tubing have angled ridges and leave air channels across adhered surfaces. These angled ridges are unsightly for some applications and cause serious problems for other applications. For taping pictures to pages, for example, they leave objectionable ridges. For attachment of paint-masking material to surfaces and between sections of cars and other objects for painting, the angled ridges leave air channels through which paint mist and fluid can travel.

Examples of flexible-tape tubing or tube tape with helical-overlap seams and means for its construction are described in U.S. Pat. No 3,485,147, issued to Hurst on Dec. 23, 1969, and U.S. Pat. No. 3,747,483, issued to Hurst on Jul. 24, 1973. Hurst taught helically wrapping a non-adherent side of adhesive tape onto a mandrel with devices that formed a helical-overlap ridge on an outside-adherent periphery of flexible-tape tubing. Angle ridges and angled vents occurred in nearly all applications of this helical-overlap tube tape.

There are a variety of needs for tube tape without the cross ridges of helical overlap. One is for the painting trade. Painting cars and other objects often requires masking or covering some surfaces while other surfaces are being painted. Single-side taping of masking material requires positioning of the tape on an adjacent surface where it is in the way. Flat tape with adhesion on two sides is not flexible laterally without tearing or leaving channel-forming ridges. A foam material on the market for masking door apertures is not fully suitable because it mixes with paint, runs and forms a sticky substance on surfaces. Much cleanup time and cost are required for removing the sticky substance and attempting to remove paint runs after painting. Helical-seam tape tubing is flexible more universally but leaves channels in which paint runs also.

SUMMARY OF THE INVENTION

In accordance with the present invention, it is contemplated that in light of problems that exist in this field, objectives of this invention are to provide linear-seam tape tubing and both means and method for its production which:

Provide double-side tape in a tape-tube form;

Has linear-overlap instead of helical-overlap seams;

Can be produced conveniently and easily on-site when and as needed;

Is flexible universally in any needed direction for masking applications; and

Can be produced and packaged in robs for commercial distribution.

This invention accomplishes the above and other objectives with a tube-tape-forming apparatus having a tube-forming base with a half-fold means on a feed end, a full-fold means on a cut-off end and a transition-fold means intermediate the half-fold means and the full-fold means. The half-fold means are guides which fold single-side-adhesion tape in half linearly with nonadhesive sides in contact. The transition-fold means brings opposite sides of folded tape towards each other selectively to form variously circumferential folding with overlap sides of the tape. The full-fold means are guides which press the overlapped sides of the folded tape together in adhesive relationship to form variously circumferential or flattened linear-seam tube tape that can be used in flattened form or hand-inflated to be used in tubular form. Hand-inflating is achieved by merely squeezing opposite sides of flattened tube tape towards each other and optionally inserting a finger or slender object into a non-adhesive interior of the tube tape. The transition-fold means and the guides can be provided with rollers. Use of the invention is accomplished by inserting a desired type of adhesive tape or masking tape into the system and pre-folding it in folding forms to be accomplished by the guides. Then pulling the tape out at the cut-off end continues a linear-folding process. A tape dispenser at the feed end and a cut-off blade at the cut-off end can be provided in accordance with use conditions.

Other objects, advantages and capabilities of the invention will become apparent from the following description taken in conjunction with the accompanying drawings showing preferred embodiments of the invention.

BRIEF DESCRIPTION OF THE DRAWINGS

FIG. 2 is a side elevation view without tape inserted into the tape forming guides;

FIG. 3 is the FIG. 2 illustration with flat tape inserted from a feed end and linear-seam tube tape formed at a cut-off end;

FIG. 4 is an elevation view of a first tape-entrance guide in half-folding relation to an adhesive flat tape;

FIG. 5 is an elevation view of a second tape-entrance guide in relation to half-folded flat tape;

FIG. 6 is an elevation view of a bottom half-fold guide and a top half-fold guide in relation to half-folded flat tape;

FIG. 7 is an elevation view of a transition guide employed as a transition-fold means;

FIG. 8 is an elevation view of a full-fold tape-entrance guide in relation to transition-folded flat tape;

FIG. 9 is an elevation view of a top full-fold guide in relation to full-folded flat tape that has been full-folded into linear-seam tube tape;

FIG. 10 is an elevation view of a bottom full-fold guide in relation to full-folded flat tape that has been full-folded into linear-seam tube tape;

FIG. 11 is an elevation view of a pair of guides for squeezing to folds of the tape to form a unitary seam;

FIG. 12 is an end view of linear-seam tube tape in an inflated form;

FIG. 13 is a side view of a length of linear-seam tube tape;

FIG. 14 is an end view of linear-seam tube take in a flattened form for some use conditions and for roll storage;

FIG. 15 is a partial cutaway elevation view of a roller on a tape guide;

FIG. 16 is a perspective view of a tube-tape-forming apparatus having rollers positioned selectively on tape guides;

FIG. 18 is a side elevation view showing the path of flat tape inserted from a feed end through the tape forming guides to form a linear-seam tube tape at a cut-off end;

FIG. 19 is an elevation section view taken along lines 19—19 of FIG. 18 showing a front elevation view of a cut-off blade;

FIG. 20 is an elevation section view taken along lines 20—20 of FIG. 18 showing a front elevation view of a pair of compression guides;

FIG. 20A is a partial elevation view of a pair of compression guides for squeezing the folds of the full-folded flat tape to form a unitary seam;

FIG. 21 is an elevation section view taken along lines 21—21 of FIG. 18 showing a front elevation view of a full-fold tape-entrance guide;

FIG. 21A is a partial elevation view of a full-fold tape-entrance guide in relation to full-folded flat tape;

FIG. 22 is an elevation section view taken along lines 22—22 of FIG. 18 showing a front elevation view of a transition guide;

FIG. 22A is a partial elevation view of a transition guide employed as a transition-fold means;

FIG. 23 is an elevation section view taken along lines 23—23 of FIG. 18 showing a front elevation view of a half-fold guide;

FIG. 23A is a partial elevation view of a half-fold guide in relation to half-folded flat tape;

FIG. 24 is an elevation section view taken along lines 24—24 of FIG. 18 showing a front elevation view of a tape-entrance guide;

FIG. 24A is a partial elevation view of a tape-entrance guide in half folding relation to an adhesive flat tape;

FIG. 25 is an elevation section view taken along lines 25—25 of FIG. 18 showing a front elevation view of an adhesive-tape-dispenser means; and FIG. 25A is an end view of an adhesive flat tape.

DESCRIPTION OF THE PREFERRED EMBODIMENTS

Figure 1:
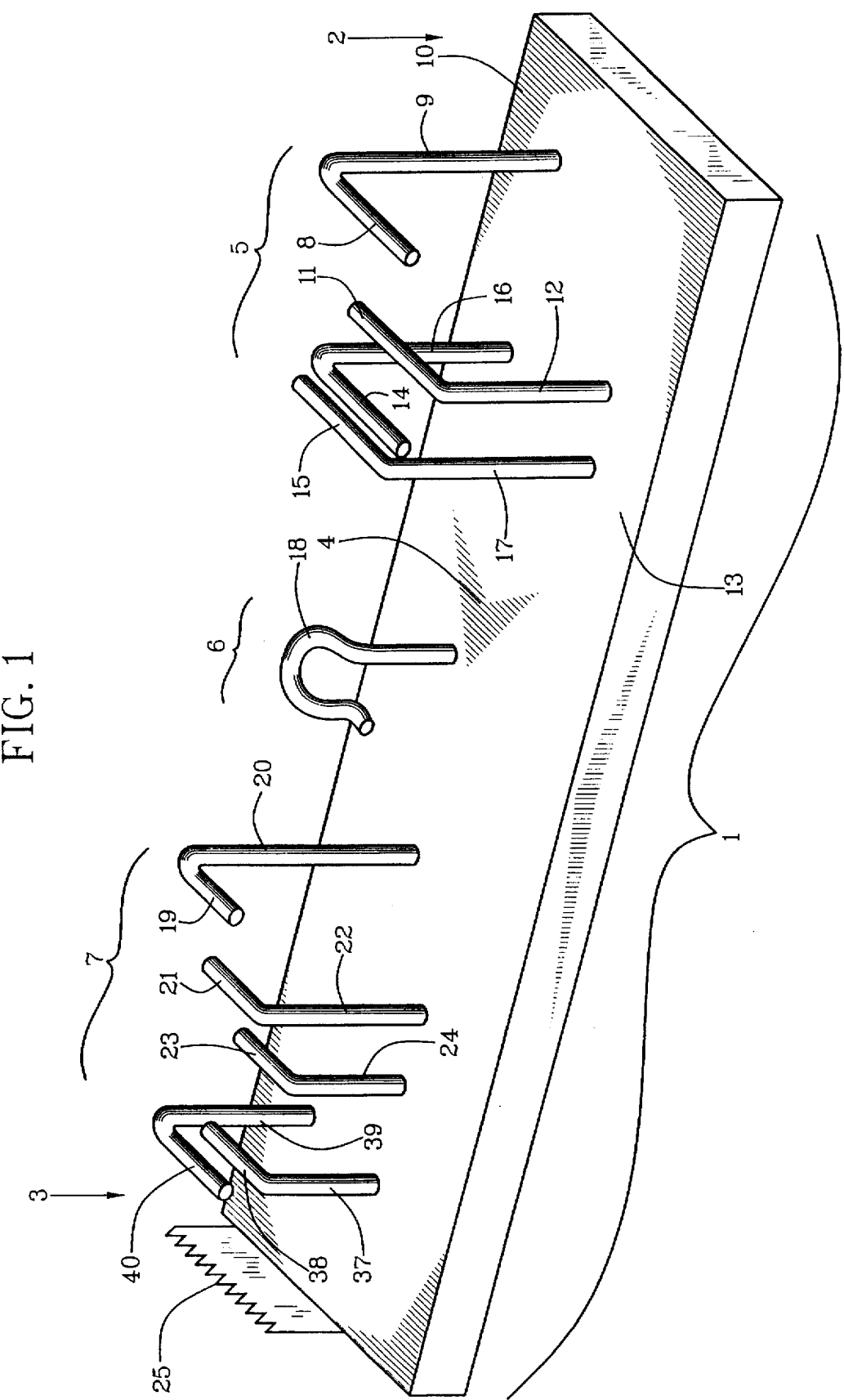
FIG. 1 is a perspective view of a tube-tape-forming apparatus.

Referring to the drawings wherein like reference numerals designate corresponding parts throughout the several figures, reference is made first to FIGS. 1–3. A tube-tape-forming apparatus has a tube-forming base 1 with a feed end 2, a cut-off end 3 and an operative side 4. Intermediate the feed end 2 and the cut-off end 3 are a half-fold means 5, a transition-fold means 6 and a full-fold means 7, all positioned on the operative side 4.

In a preferred on-site embodiment shown in the various figures for convenience of on-site use, the half-fold means 5 is comprised first of a first tape-entrance guide 8 that is positioned horizontally above the tube-forming base 1 and extended from a first entrance-guide support 9 on a first side 10 of the tube-forming base 1. The first tape-entrance guide 8 is extended horizontally for a distance of at least one-half of a width of flat tape to be formed into linear-seam tube tape.

The half-fold means 5 is comprised next of a second tape-entrance guide 11, also referred to as a low half-fold member, positioned horizontally above the tube-forming base 1 and extended from a second entrance-guide support 12 on a second side 13 of the tube-forming base 1. The second tape-entrance guide 11 and the second entrance-guide support 12 are positioned in line in a folding relationship with flat tape that is in sliding contact with the first tape-entrance guide 8. Next to the second entrance-guide support 12 in proceeding down stream from the feed end 2 are a bottom half-fold guide 14, also referred to as an intermediate half-fold member, and a top half-fold guide 15, also referred to as a top half-fold member. The bottom half-fold guide 14 is positioned horizontally above the operative side 4 and extended from a bottom half-fold support 16 on a first select side 10 of the tube-forming base 1. The top half-fold guide 15 is positioned horizontally above the bottom-half-fold guide 14 and extended from a top half-fold support 17 on a second select side 13 of the tube-forming base 1. The term "half-fold" is used in a general descriptive sense inasmuch as the folds of the tape are not normally exactly half-folds, but may be varied as the situation demands.

Vertical distance between the bottom half-fold guide 14 and the top half-fold guide 15 is designed to allow passage of half-folded flat tape having a first portion between guides 14 and 15, and a second portion beneath guide 14. This vertical distance can be adjusted for different tape sizes and thicknesses. The bottom surface of the bottom half-fold guide 14 and the upper surface of guide 14 are in sliding contact with opposite portions of non-adhesive sides of adhesive tape proceeding through the system.

A transition-fold means 6 in this on-site embodiment is a guide loop 18. Shaped similar to an eye bolt and altered as necessary for different tape widths and thicknesses, the guide loop 18 is formed to begin the creation of an overlap of one side of the tape onto an opposite side of the tape. It is positioned intermediate the half-fold means 5 and the full-fold means 7 on the operative side 4 of the tube-forming base 1.

The full-fold means 7 for this on-site embodiment is comprised first of a full-fold entrance guide 19 positioned horizontally above the tube-forming base 1 and extended from a full-fold support 20 on a select side 10 or 13 of the operative side 4 of the tube-forming base 1. The full-fold entrance guide 19 can be shorter than the half-fold entrance guides 8 and 11 because flat tape in sliding contact with it is in a rolled and overlapped form. Generally, the full-fold entrance guide 19 is extended at least one-fourth of a flat width of the tape. Proceeding towards the cut-off end 3, the next component of the full-fold means 7 is a top full-fold guide 21 positioned horizontally above the tube-forming base 1 and extended from a top full-fold support 22 on a select side 10 or 13 of the operative side 4 of the tube-forming base 1. Next is a bottom full-fold guide 23 positioned horizontally above the tube-forming base 1 at a position designedly towards the cut-off end 3 of the tube-forming base 1 from the top full-fold guide 21. The bottom full-fold guide 23 is extended from a bottom full-fold support 24 on a select side 10 or 13 of the operative side 4 of the tube-forming base 1. A tube-entrance distance vertically and a design distance horizontally between the top full-fold guide 21 and the bottom full-fold guide 23 is designed to allow a particular size and thickness of linearly folded tape to pass between them for providing a design tightness of full fold.

FIG. 11 shows supports 37 and 39 having respective compression guides 38 and 40 between which the tape moves to compress the opposite sides 36 of the tape together to positively form the finished tape tube.

On the cut-off end 3 can be a cut-off blade 25. It projects vertically and can have saw teeth as shown, or any other suitable configuration, to aid in hand-cutting linear-seam tube tape that can be hand-extruded from an on-site embodiment of this tube-tape-forming apparatus.

As shown in FIGS. 2 and 3, adhesive tape 26 with single-side adhesion is fed to the first tape-entrance guide 8 from an adhesive-tape-dispenser means 27 at the feed end 2 of the tube-forming base 1. Adhesive tape 26 can be any form of masking tape, cellophane tape, duct tape or other type of single-side-adhesion tape. For car painting and other painting applications, the adhesive tape 26 is a desired grade and size of masking tape. Generally but not necessarily, the adhesive tape 26 can be in a roll and the adhesive-tape-dispenser means 27 can attached to related equipment or attached directly to the feed end 2 of the tube-forming base 1. Adhesive tape 26 being unrolled from a roll 28 has an adhesive side 29 facing the roll 28 and a non-adhesive side 30 that is external in relation to the roll 28.

In FIGS. 3 and 4, the adhesive tape 26 is shown being folded backwards in a half-fold over the first tape-entrance guide 8 with the non-adhesive side 30 in slidable contact with a bottom surface of the first tape-entrance guide 8. Proceeding to the second tape-entrance guide 11 as shown in FIGS. 3 and 5, an adhesive side 29 of a top half of folded tape 26 is in slidable contact with a top surface of the second tape-entrance guide 11. As shown in FIGS. 3 and 6, two adhesive sides 30 on outsides of folded tape 26 are then positioned in slidable contact with both the bottom and top surfaces of half-fold guide 14 and beneath the top half-fold guide 15. Opposite ends of half-folded tape 26 then are begun to be forced towards each other by sliding contact with the top outside peripheral walls of the guide loop 18 to form a loop as shown in FIGS. 3 and 7. Passing under a bottom surface of the full-fold entrance guide 19 and both over and under the top and bottom surfaces of the top full-fold guide 21 where the tape is positioned for final folding. At the full-fold guide 23 as shown in FIGS. 3 and 10, full-folded tape 26 is formed finally into variously circumferential linear-seam tube tape 31, shown in FIGS. 12 and 13, or flat-folded linear-seam tube tape 32 shown in FIG. 14.

In the prior discussion, the tape is described as having the tape adhesive side 29 in contact with the guides during the moving tape folding process. However, the adhesion of the tape to the guides is quite minimal and does not adversely affect the process.

Depicted in FIGS. 15 and 16 are guide rollers 33 that can be employed on all guides 8, 11, 14, 15, 19, 21, 23, 38 and 40. A series of short guide rollers 33 can be positioned arcuately on the guide loop 18 also. Guide rollers 33 decrease adherence of the adhesive side 29 of tape 26 shown in FIGS. 2–14. As shown in FIG. 15, the guide rollers 33 can be positioned rotationally on a shaft extension 34 of the guides 8, 11, 14, 15, 19, 21, 23, 38 and 40.

It is foreseeable that relatively sophisticated alterations and modifications of this tube-tape-forming apparatus can be made without departing from this invention. In-plant manufacturing embodiments in particular may appear different without departing from the principles of this invention.

Typical of foreseeable modifications are variations of sizes and shapes of the guide loop 18 and the guides 8, 11, 14, 15, 19, 21, 23, 38 and 40 for different thickness and widths of adhesive tape 26. Horizontal and vertical positioning of the guide loop 18 and the guides 8, 11, 14, 15, 19, 21, 23, 38 and 40 on the tube-forming base 1 can be varied also for different thicknesses, widths and flexibility of the tape 26 that is formed into tube tape 31 and 32. A tube-forming base 1 with provision for convenience of adjustment of positioning and exchanging the guide loop 18 and the guides 8, 11, 14, 15, 19, 21, 23, 38 and 40 is foreseeable. Also foreseeable are sets of differently formed guide loop 18 and the guides 8, 11, 14, 15, 19, 21, 23, 38 and 40 that are interchangeable or fixable permanently on particular tube-forming bases I for different tape characteristics and for particular on-site and plant-manufacturing conditions. Thickness of the adhesive tape 26 is magnified in the drawings for material demonstration purposes.

Use of this tube-tape-forming apparatus is accomplished by inserting single-side-adhesive tape 26 into the system and first hand-folding the tape 26 in progressive forms which are then achieved by the guides 8, 11, 14, 15, 19, 21, 23, 38 and 40 in combination with the guide loop 18 by pulling the tape through the guides 38 and 40. The progressive forms for hand-folding the tape 26 are described above in relation to FIGS. 1–14.

FIGS. 12–14 illustrate a linear-overlap seam 35 that is formed by overlap of opposite sides 36 of the adhesive tape 26 which then becomes variously circumferential linear-seam tube tape 31 or flat-folded linear-seam tube tape 32, depending on how it is handled after being pulled from the tube-tape-forming apparatus. FIGS. 7–11 show the opposite sides 36 of the adhesive tape 26 being positioned for formation of the linear-overlap seam 35 shown in FIGS. 12–14.

Figure 17:
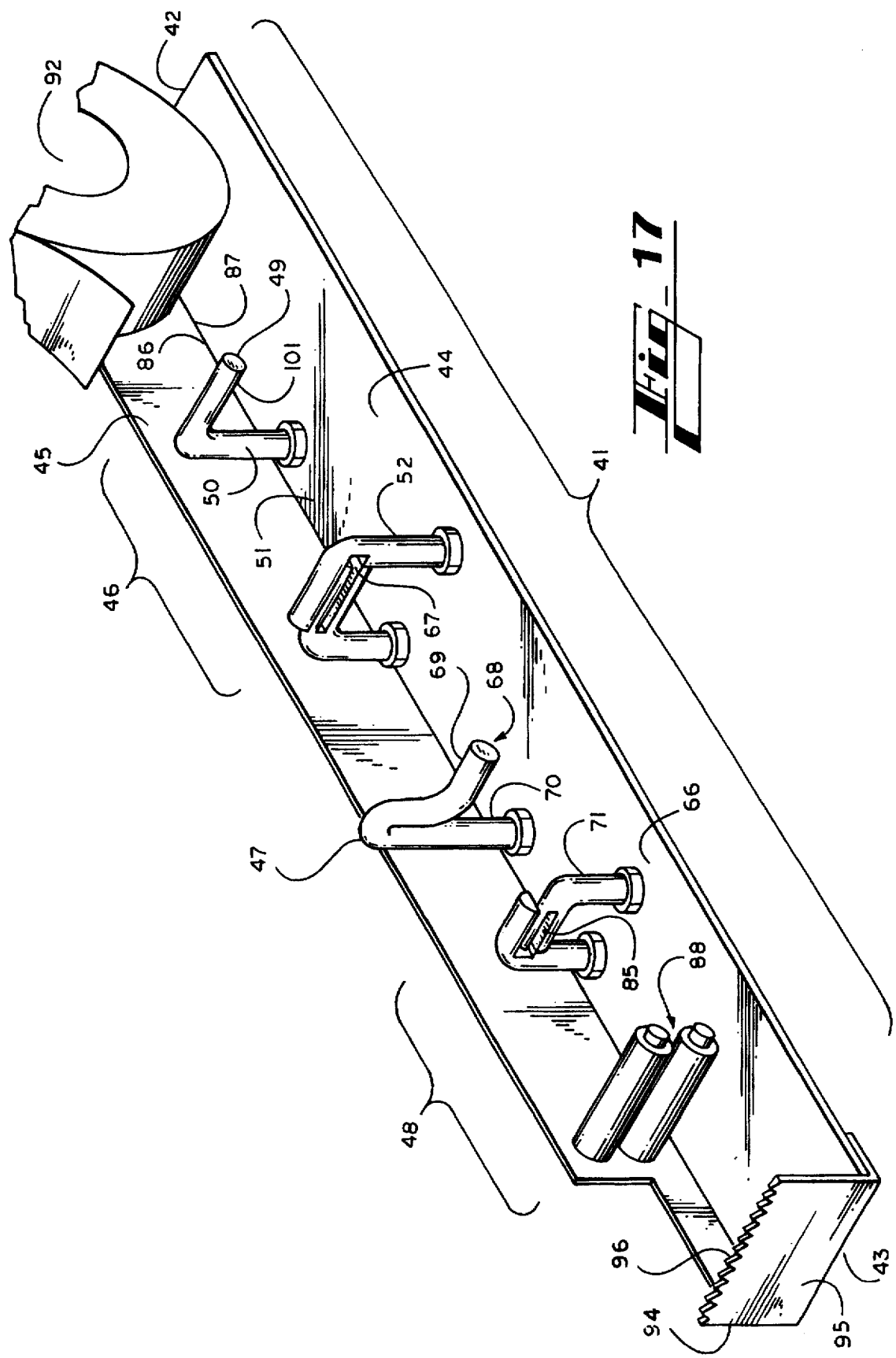
FIG. 17 is a perspective view of another embodiment of a tube-tape-forming apparatus.

Referring to the embodiment shown in FIGS. 17–25 and FIGS. 20A–25A, reference is made first to FIG. 17. A tube-tape-forming apparatus has a tube-forming base 41 with a feed end 42, a cut-off end 43, an operative side 44 and a mounting side 45. Intermediate the feed end 42 and the cut-off end 43 are a half-fold means 46, a transition-fold means 47 and a full-fold means 48, all positioned on the operative side 44.

In a preferred on-site embodiment shown in the various figures for convenience of on-site use, the half-fold means 46 is comprised first of a tape-entrance guide 49 that is positioned horizontally above the tube-forming base 41 and extended from an entrance-guide support 50 on a first side 51 of the tube-forming base 41. The tape-entrance guide 49 is extended horizontally for a distance of at least one-half of a width of flat tape to be formed into linear-seam tube tape.

The half-fold means 46 is comprised next of a half-fold guide 52 having a low half-fold member 53, an intermediate half-fold member 54 and a top half-fold member 55. The low half-fold member 53 having a first junction end 56 and a first upper surface 57 is positioned horizontally above the operative side 44 and extended from a low half-fold support 58 having a first inner surface 59 on the first side 51 of the tube-forming base 41. The intermediate half-fold member 54 having a first lower surface 60, a first end surface 61 and a second upper surface 62 is positioned horizontally above the low half-fold member 53 and also extended from the low half-fold support 58. The top half-fold member 55 having a second lower surface 63 is positioned horizontally above the intermediate half-fold member 54 and extended from a top half-fold support 64 having a second inner surface 65 on a second side 66 of the tube-forming base 41. Although not required for successful operation, the preferred embodiment of the tube-tape-forming apparatus is designed with the top half-fold support 64 positioned in contact with the first junction end 56 of the low half-fold member 53. The half-fold guide 52 is positioned in line in a folding relationship with flat tape that is in sliding contact with the tape-entrance guide 49. The term "half-fold" is used in a general descriptive sense inasmuch as the folds of the tape are not normally exactly half-folds, but may be varied as the situation demands.

The first upper surface 57 of the low half-fold member 53, the first inner surface 59 of the low half-fold support 58, the first lower surface 60, the first end surface 61 and the second upper surface 62 of the intermediate half-fold member 54, the second inner surface 65 of the top half-fold support 64 and the second lower surface 63 of the top half-fold member 55 define a first U-shaped slot 67. The flat tape traveling from the tape-entrance guide 49 is in sliding contact through the first U-shaped slot 67 with the half-fold guide 52 to form laterally half-folded tape.

The vertical distance between the first upper surface 57 of the low half-fold member 53 and the first lower surface 60 of the intermediate half-fold member 54, the vertical distance between the second upper surface 62 of the intermediate half-fold member 54 and the second lower surface 63 of the top half-fold member 55 and the horizontal distance between the first end surface 61 of the intermediate half-fold member 54 and the second inner surface 65 of the top half-fold support 64 are designed to allow passage of half-folded flat tape having a single layer between the respective surfaces. As flat tape having a non-adhesive side and an adhesive side enters the first U-shaped slot 67, the non-adhesive side of the flat tape is in slidable contact with the first lower surface 60, the first end surface 61 and the second upper surface 62 of the intermediate half-fold member 54. Likewise, the adhesive side of the flat tape is in slidable contact with the first upper surface 57 of the low half-fold member 53, the second inner surface 65 of the top half-fold support 64 and the second lower surface 63 of the top half-fold member 55. These vertical and horizontal distances can be adjusted for different tape sizes and thicknesses.

A transition-fold means 47 in this on-site embodiment is a transition-fold guide 68. The transition-fold guide is comprised of a transition member 69 and a transition member support 70. FIGS. 22 and 22A show the preferred transition member 69 having a C-shape configuration. A L-shape configured transition member, not shown in the figures, is also an effective variation of the transition member 69. Altered as necessary for different tape widths and thicknesses, the transition member 69 is formed to begin the creation of an overlap of one side of the tape onto an opposite side of the tape forming a looped-folded tape. It is extended from the transition member support 70 and positioned intermediate the half-fold means 46 and the full-fold means 48 on the operative side 44 of the tube-forming base 41 in central looped-folding relationship to half-folded tape that is in sliding contact with the half-fold guide 52.

The full-fold means 48 for this on site embodiment is comprised first of a full-fold guide 71 having a low full-fold member 72, an intermediate full-fold member 78 and a top full-fold member 74. The low full-fold member 72 having a second junction end 75 and a third upper surface 76 is positioned horizontally above the operative side 44 and extended from a low full-fold support 77 having a third inner surface 78 on the second side 66 of the tube-forming base 41. The intermediate full-fold member 73 having a third lower surface 79, a second end surface 80 and a fourth upper surface 81 is positioned horizontally above the low full-fold member 72 and also extended from the low full-fold support 77. The top full-fold member 74 having a fourth lower surface 82 is positioned horizontally above the intermediate full-fold member 73 and extended from a top full-fold support 83 having a fourth inner surface 84 on the first side 51 of the tube-forming base 41. Although not required for successful operation, the preferred embodiment of the tube-tape-forming apparatus is designed with the top full-fold support 83 positioned in contact with the second junction end 75 of the low full-fold member 72. The full-fold guide 71 is positioned in line in full-folding relationship with the looped-folded tape that is in sliding contact with the transition fold means 47.

The third upper surface 76 of the low full-fold member 72, the third inner surface 78 of the low full-fold support 77, the third lower surface 79, the second end surface 80 and the fourth upper surface 81 of the intermediate full-fold member 73, the fourth inner surface 84 of the top full-fold support 83 and the fourth lower surface 82 of the top full-fold member 74 define a second U-shaped slot 85. The looped-folded tape traveling from the transition-fold means 47 is in sliding contact through the second U-shaped slot 85 with the full-fold guide 71 to form a full-folded tape having overlapping seams.

The vertical distance between the third upper surface 76 of the low full-fold member 72 and the third lower surface 79 of the intermediate full-fold member 73 is designed to allow passage between them of a particular size and thickness of linearly half-folded tape having two layers. The vertical distance between the fourth upper surface 81 of the intermediate full-fold member 73 and the fourth lower surface 82 of the top full-fold member 74 and the horizontal distance between the second end surface 80 of the intermediate full-fold member 73 and the fourth inner surface 84 of the top full-fold support 83 are designed to allow passage of full-folded flat tape having a single layer between the respective surfaces. These vertical and horizontal distances can be adjusted for different tape sizes and thicknesses.

As looped-folded tape enters the second U-shaped slot 85, the non-adhesive side of the looped-folded tape is in slidable contact with the fourth upper surface 81 and the second end surface 80 of the intermediate full-fold member 73. The adhesive side of the looped-folded tape is in slidable contact with the fourth lower surface 82 of the top full-fold member 74, the fourth inner surface 84 of the top full-fold support 83, the third upper surface 76 of the low full-fold member 72, the third inner surface 78 of the low full-fold support 77 and the fourth upper surface 81 of the intermediate full-fold member 73.

In the preferred embodiment the mounting side 45 has a lower end 86. The mounting side 45 is connected at the lower end thereof to an edge 87 of the tube-forming base 41 on the operative side 44.

The full-fold means 48 is comprised next of a compression guide 88. FIGS. 20 and 20A show the compression guide 88 having an upper compression member 89 and a lower compression member 90. The compression guide 88 is positioned centrally in compressing relationship to the full-folded tape that is in sliding contact with the full-fold guide 71. Both the upper compression member 89 and the lower compression member 90 are extended from the mounting side 45 and positioned horizontally above the operative side 44. In the preferred embodiment the compression guide 88 is provided with guide rollers 91 positioned rotationally on the compression members 89 and 90. The full-folded tape in slidable contact with the full-fold guide 71 travels through the compression members 89 and 90 to compress the opposite sides of the tape together to positively form the finished tape tube.

At the feed end 42 can be an adhesive-tape dispenser means 92. The adhesive-tape dispenser means 92 can be attached to related equipment or attached directly to the tube-tape-forming apparatus. FIGS. 18 and 25 show the adhesive-tape dispenser means as a tape dispenser 93 rotatably attached to the mounting side 45 at the feed end 42 of the tube-forming base 41.

On the cut-off end 43 can be a cut-off means 94. The cut-off means 94 can be an automated cutting device, or as in the preferred on-site embodiment, it can be a cut-off blade 95 as shown in FIG. 19. The cut-off blade 95 projects vertically above the operative side 44 and can have saw teeth 96 as shown, or any other suitable configuration, to aid in hand-cutting linear-seam tube tape that can be hand-extruded from an on-site embodiment of this tube-tape-forming apparatus.

As shown in FIG. 18, adhesive tape 97 in a roll 98 with single-side adhesion is fed to the tape-entrance guide 49 from an adhesive-tape-dispenser means 92 at the feed end 42 of the tube-forming base 41. Adhesive tape 97, as shown in FIG. 25A, can be any form of masking tape, cellophane tape, duct tape or other type of single-side-adhesion tape. For automobile painting and other painting applications, the adhesive tape 97 is a desired grade and size of masking tape. Adhesive tape 97 being unrolled from the roll 98 has an adhesive side 99 facing the roll 98 and a non-adhesive side 100 that is external in relation to the roll 98.

In FIGS. 18 and 24A, the adhesive tape 97 is shown being folded in a vertical direction in relation to the operative side 44 by the tape-entrance guide 49 with the non-adhesive side 100 in slidable contact with a bottom surface 101 of the tape-entrance guide 49. Proceeding to the half-fold guide 52 as shown in FIGS. 18 and 23A, the adhesive tape 97 is half-folded by the half-fold members 53, 54 and 55 to form a half-folded tape 102. As the adhesive tape 97 travels through the first U-shaped slot 67, the non-adhesive side 100 is in slidable contact with the first lower surface 60, the first end surface 61 and the second upper surface 62 of the intermediate half-fold member 54. Likewise, the adhesive side 99 is in slidable contact with the first upper surface 57 of the low half-fold member 53, the second inner surface 65 of the top half-fold support 64 and the second lower surface 63 of the top half-fold member 55.

Proceeding to the transition-fold guide 68 as shown in FIGS. 18 and 22A, the adhesive tape 97 is looped-folded. The adhesive side 99 of the adhesive tape 97 is in slidable contact with a top outside peripheral wall 103 of the transition member 69. Opposite ends of the half-folded tape 102 then are begun to be forced towards each other by sliding contact with the top outside peripheral wall 103 of the transition member 69 to form a looped-folded tape 104.

In FIGS. 18 and 21A, the adhesive tape 97 is full-folded by the full-fold members 72, 73 and 74 of the full-fold guide 71 to form a full-folded tape 105. As the adhesive tape 97 travels through the second U-shaped slot 85, the non-adhesive side 100 of the adhesive tape 97 is in slidable contact with the fourth upper surface 81 and the second end surface 80 of the intermediate full-fold member 73. The adhesive side 99 of the adhesive tape 97 is in slidable contact with the fourth lower surface 82 of the top full-fold member 74, the fourth inner surface 84 of the top full-fold support 83, the third upper surface 76 of the low full-fold member 72, the third inner surface 78 of the low full-fold support 77 and the fourth upper surface 81 of the intermediate full-fold member 73. As shown in FIGS. 18 and 20A, the full-folded tape 105 in slidable contact with the full-fold guide 71 travels between the compression members 89 and 90 to compress the opposite sides of the adhesive tape 97 together to positively form a finished circumferential linear-seam tube tape 106.

In the prior discussion and shown in the drawings, the adhesive tape 97 is described as having the adhesive side 99 in contact with the guides during the moving tape folding process. However, the adhesion of the tape to the guides is quite minimal and does not adversely affect the process.

It is foreseeable that relatively sophisticated alterations and modifications of this tube-tape-forming apparatus can be made without departing from this invention. In-plant manufacturing embodiments in particular may appear different without departing from the principles of this invention. Typical of foreseeable modifications are variations of shapes of the transition member 69 and the guides 49, 52, 71 and 88 for different thickness and widths of adhesive tape 97. Horizontal and vertical positioning of the guides 49, 52, 68, 71 and 88 and the members 53, 54, 55, 72, 73, 74, 89 and 90 on the tube-forming base 41 can be varied also for different thicknesses, widths and flexibility of the tape 97 that is formed into the circumferential linear-seam tube tape 106. A tube-forming base 41 with provision for convenience of adjustment of positioning and exchanging the guides 49, 52, 68, 71 and 88 is foreseeable. Also foreseeable are sets of differently formed guides 49, 52, 68, 71 and 88 that are interchangeable or fixable permanently on particular tube-forming bases 41 for different tape characteristics and for particular on-site and plant-manufacturing conditions. Further, it is foreseeable that each of guides 52 and 71 can be manufactured as a single unit construction, eliminating the first junction end 56 of the low half-fold member 53 and the second junction end 75 of the low full-fold member 72. Thickness of the adhesive tape 97 is magnified in the drawings for material demonstration purposes.

Use of this tube-tape-forming apparatus is accomplished by inserting single-side-adhesive tape 97 into the system and first hand-folding the adhesive tape 97 in progressive forms which are then achieved by the guides 49, 52 and 71 in combination with the transition-fold guide 68 by pulling the adhesive tape 97 through the compression guide 88. The progressive forms for hand-folding the adhesive tape 97 are described above in relation to FIGS. 17–25A.

Various modifications may be made of the invention without departing from the scope thereof and it is desired, therefore, that only such limitations shall be placed thereon as are imposed by the prior art and which are set forth in the appended claims.

What is claimed is:

1. A tube-tape-forming apparatus for forming tubular tape having overlapping seams, comprising:
    a tube-forming base having a feed end, a cut-off end and an operative side, the operative side being intermediate the feed end and the cut-off end of the tube forming base;
    a half-fold means for forming laterally half-folded tape extending from the operative side at a predetermined distance from the feed end of the tube-forming base, the half-fold means having a top half-fold member, an intermediate half-fold member and a low half-fold member;

a transition-fold means extending from the operative side proximate a center portion of the tube-forming base;

a full-fold means extending from the operative side at a predetermined distance from the cut-off end of the tube-forming base; and the half-fold means further having a first tape-entrance guide positioned horizontally above the tube-forming base and extended from a first entrance-guide support on a first side of the tube-forming base for a distance of at least one-half of a width of flat tape to be formed into tube tape, the first tape-entrance guide being in sliding contact with a non-adhesive side of the flat tape entering the tube-tape-forming apparatus from the feed end of the tube-forming base, the low half-fold member positioned horizontally above the tube-forming base and extended from a second entrance-guide support on a second side of the tube-forming base for a distance of at least one-half of a width of the flat tape, the low half-fold member being positioned in line in half-folding relationship with flat tape that is in sliding contact with the first tape-entrance guide, the low half-fold member being in sliding contact with an adhesive side of the flat tape that is folded linearly by central-positioning relationship of the second entrance-guide support and the low half-fold member to the first tape-entrance guide, the intermediate half-fold member positioned horizontally above the tube-forming base and extended from a bottom half-fold support on a first side of the tube-forming base for a distance of at least one-half of a width of the flat tape, the intermediate half-fold member having an upper surface and a lower surface, the upper and lower surfaces of the intermediate half-fold member being in sliding contact with a bottom non-adhesive side of half-folded tape traveling from the low half-fold member and the second entrance-guide support, the top half-fold member positioned horizontally above the intermediate half-fold member and extended from a top half-fold support on a second side of the tube-forming base for a distance of at least one-half of a width of the flat tape, and the intermediate half-fold member and the top half-fold member are juxtaposed to each other for causing a predetermined tightness of half-fold of the half-folded tape.

2. A tube-tape-forming apparatus as claimed in claim 1, wherein the transition-fold means is a guide loop extended from the tube-forming base and having a size and shape to form laterally half-folded tape into a looped fold with adhesive sides of the looped fold in sliding contact with an outside periphery of the guide loop as loop-folded tape travels from the half-fold means to the full-fold means.

3. A tube-tape-forming apparatus as claimed in claim 2 and further comprising the tube-forming base having an edge and a mounting side having a lower end, the lower end connected to the edge of the tube-forming base, wherein the full fold means is comprised of:

a full-fold guide having a low full-fold member, an intermediate full-fold member and a top full-fold member on the tube-forming base, the full-fold guide positioned between the transition-fold means and the cut-off end and in line in full-folding relationship with a looped-folded tape having an adhesive side that is in sliding contact with the transition-fold means, the low full-fold member having a third upper surface extended from a low full-fold support on the second side of the tube-forming base for a distance of at least one-fourth of a width of the flat tape, the intermediate full-fold member having a third lower surface, a second end surface and a fourth upper surface positioned between the low full-fold member and the top full-fold member and extended from the low full-fold support for a distance of at least one-fourth of a width of the flat tape, the top full-fold member having a fourth lower surface extended from a top full-fold support on the first side of the tube-forming base for a distance of at least one-fourth of a width of the flat tape, the low full-fold support having a third inner surface, the top full-fold support having a fourth inner surface, the third upper surface of the low full-fold member, the third inner surface of the low full-fold support, the third lower surface, the second end surface and the fourth upper surface of the intermediate full-fold member, the fourth inner surface of the top full-fold support and the fourth lower surface of the top full-fold member defining a U-shaped slot, whereby the looped tape traveling from the transition-fold means is in sliding contact through the U-shaped slot with the full-fold guide to form a full-folded tape having overlapping seams, and a compression guide extended from the mounting side and positioned between the full-fold guide and the cut-off end for compressing together the full-folded tape overlapping seams.

4. A tube-tape-forming apparatus as claimed in claim 2, wherein the full-fold means is comprised of:

a full-fold tape-entrance guide positioned horizontally above the tube-forming base and extended from a full-fold entrance support on a predetermined side of the tube-forming base for a distance of at least one-fourth of a width of flat tape being formed into tube tape, the full-fold tape-entrance guide being in sliding contact with an adhesive side of folded flat tape traveling from the transition-fold means to the full-fold means, a top full-fold guide positioned horizontally above the tube-forming base and extended from a top full-fold support on the tube-forming base for a distance of at least one-fourth of a width of the flat tape at a position towards the cut-off end of the tube-forming base from the transition-fold means, the top full-fold guide having an upper surface and a lower surface, the lower surface of the top full-fold guide being in sliding contact with a top adhesive side of the half-folded tape traveling from the transition-fold means to the full-fold means, and the upper surface of the top full-fold guide being in sliding contact with a bottom non-adhesive side of the half-folded tape, a bottom full-fold guide positioned horizontally above the tube-forming base at a position between the top full-fold guide and the cut-off end of the tube-forming base and extended from a bottom full-fold support on a second predetermined side of the tube-forming base for a distance of at least one-fourth of a width of the flat tape being formed into tube tape, the bottom full-fold guide being in sliding contact with a bottom adhesive side of full-folded tape traveling from the full-fold means towards the cut-off end of the tube-forming base, the bottom full-fold guide and the top full-fold guide being disposed at different heights relative to each other above the tube-forming base, and compression guide means positioned between the bottom full-fold guide and the cut-off end for compressing together the full-folded tape overlapping seams.

5. A tube-tape-forming apparatus as claimed in claim 4 and further comprising rollers positioned selectively on the first tape-entrance guide, low half-fold member, top half-fold member, intermediate half-fold member, full-fold tape-entrance guide, top full-fold guide, bottom full-fold guide and compression guide means.

6. A tube-tape-forming apparatus as claimed in claim 4 and further comprising a cut-off blade on the cut-off end of the tube-forming base.

7. A tube-tape-forming apparatus as claimed in claim 6 and further comprising a tape dispenser on the feed end of the tube-forming base.

8. A tube-tape-forming apparatus as claimed in claim 7 and further comprising rollers positioned selectively on the first tape-entrance guide, low half-fold member, top half-fold member, intermediate half-fold member, full-fold tape-entrance guide, top full-fold guide, bottom full-fold guide and compression guide means.

9. A tube-tape-forming apparatus as claimed in claim 1, wherein the full-fold means is comprised of:

a full-fold tape-entrance guide positioned horizontally above the tube-forming base and extended from a full-fold entrance support on a predetermined side of the tube-forming base for a distance of at least one-fourth of a width of flat tape being formed into tube tape, the full-fold tape-entrance guide being in sliding contact with an adhesive side of folded flat tape traveling from the transition-fold means to the full-fold means, a top full-fold guide positioned horizontally above the tube-forming base and extended from a top full-fold support on a predetermined side of the tube-forming base for a distance of at least one-fourth of a width of the flat tape at a position designedly towards the cut-off end of the tube-forming base from the transition-fold means, the top full-fold guide being in sliding contact with a top adhesive side of the half-folded tape traveling from the transition-fold means to the full-fold means, a bottom full-fold guide positioned horizontally above the tube-forming base at a position between the top full-fold guide and the cut-off end of the tube-forming base and extended from a bottom full-fold support on a second predetermined side of the tube-forming base for a distance of at least one-fourth of a width of the flat tape being formed into tube tape, the bottom full-fold guide being in sliding contact with a bottom adhesive side of full-folded tape traveling from the full-fold means towards the cut-off end of the tube-forming base, the bottom full-fold guide and the top full-fold guide being disposed at different heights relative to each other above the tube-forming base, and compression guide means positioned between the bottom full-fold guide and the cut-off end for compressing together the full-folded tape overlapping seams.

10. A tube-tape-forming apparatus as claimed in claim 1 wherein the transition-fold means is a transition-fold guide having a transition member and a transition member support, the transition member support being mounted to the tube-forming base, the transition member depending from the transition member support, having an outside periphery and having a size and a shape to form laterally half-folded tape into a looped-folded tape with the adhesive sides of the looped-folded tape in sliding contact with the outside periphery of the transition member as looped-folded tape travels from the half-fold means to the full-fold means.

11. A tube-tape-forming apparatus as claimed in claim 10 and further comprising the tube-forming base having an edge and a mounting side having a lower end, the lower end connected to the edge of the tube-forming base, wherein the full fold means is comprised of:

a full-fold guide having a low full-fold member, an intermediate full fold member and a top full-fold member on the tube-forming base, the full-fold guide positioned between the transition-fold means and the cut-off end and in line in full-folding relationship with a looped-folded tape having an adhesive side that is in sliding contact with the transition-fold means, the low full-fold member having a third upper surface extended from a low full-fold support on a second side of the tube-forming base for a distance of at least one-fourth of a width of the flat tape, the intermediate full-fold member having a third lower surface, a second end surface and a fourth upper surface positioned between the low full-fold member and the top full-fold member and extended from the low full-fold support for a distance of at least one-fourth of a width of the flat tape, the top full-fold member having a fourth lower surface extended from a top full-fold support on a first side of the tube-forming base for a distance of at least one-fourth of a width of the flat tape, the low full-fold support having a third inner surface, the top full-fold support having a fourth inner surface, the third upper surface of the low full-fold member, the third inner surface of the low full-fold support, the third lower surface, the second end surface and the fourth upper surface of the intermediate full-fold member, the fourth inner surface of the top full-fold support and the fourth lower surface of the top full-fold member defining a U-shaped slot, whereby the looped tape traveling from the transition-fold means is in sliding contact through the U-shaped slot with the full-fold guide to form a full-folded tape having overlapping seams, and a compression guide extended from the mounting side and positioned between the full-fold guide and the cut-off end for compressing together the full-folded tape overlapping seams.

12. A tube-tape-forming apparatus as claimed in claim 1 and further comprising the tube-forming base having an edge and a mounting side having a lower end, the lower end connected to the edge of the tube-forming base, wherein the full fold means is comprised of:

a full-fold guide having a low full-fold member, an intermediate full-fold member and a top full-fold member on the tube-forming base, the full-fold guide positioned between the transition-fold means and the cut-off end and in line in full-folding relationship with a looped-folded tape having an adhesive side that is in sliding contact with the transition-fold means, the low full-fold member having a third upper surface extended from a low full-fold support on the second side of the tube-forming base for a distance of at least one-fourth of a width of the flat tape, the intermediate full-fold member having a third lower surface, a second end surface and a fourth upper surface positioned between the low full-fold member and the top full-fold member and extended from the low full-fold support for a distance of at least one-fourth of a width of the flat tape, the top full-fold member having a fourth lower surface extended from a top full-fold support on the first side of the tube-forming base for a distance of at least one-fourth of a width of the flat tape, the low full-fold support having a third inner surface, the top full-fold support having a fourth inner surface, the third upper surface of the low full-fold member, the third inner surface of the low full-fold support, the third lower surface, the second end surface and the fourth upper surface of the intermediate full-fold member, the fourth inner surface of the top full-fold support and the fourth lower surface of the top full-fold member defining a U-shaped slot, whereby the looped tape traveling from the transition-fold means is in sliding contact through the U-shaped slot with the full-fold guide to form a full-folded tape having overlapping seams, and a compression guide extended from the mounting side and positioned between the full-fold guide and the cut-off end for compressing together the full-folded tape overlapping seams.

13. A tube-tape-forming apparatus for forming tubular tape having overlapping seams, comprising:

a tube-forming base having a feed end, a cut-off end and an operative side, the operative side being intermediate the feed end and the cut-off end of the tube forming base;

a half-fold means extending from the operative side at a predetermined distance from the feed end of the tube-forming base;

a transition-fold means extending from the operative side proximate a center portion of the tube-forming base; and a full-fold means extending from the operative side at a predetermined distance from the cut-off end of the tube-forming base: the full-fold means having a full fold tape-entrance guide positioned horizontally above the tube-forming base and extended from a first full-fold support on a predetermined side of the tube-forming base for a distance of at least one-fourth of a width of flat tape being formed into tube tape, the full-fold tape-entrance guide being in sliding contact with an adhesive side of folded flat tape traveling from the transition-fold means to the full-fold means, a top full-fold guide positioned horizontally above the tube-forming base and extended from a top full-fold support on the tube-forming base for a distance of at least one-fourth of a width of the flat tape at a position between the transition-fold means and the cut-off end of the tube-forming base, the top full-fold guide having an upper surface and a lower surface, the lower surface of the top full-fold guide being in sliding contact with a top adhesive side of the half-folded tape traveling from the transition-fold means to the full-fold means, and the upper surface of the top full-fold guide being in sliding contact with a bottom non-adhesive side of the half-folded tape, a bottom full-fold guide positioned horizontally above the tube-forming base at a position between the top full-fold guide and the cut-off end of the tube-forming base and extended from a bottom full-fold support on a second predetermined side of the tube-forming base for a distance of at least one-fourth of a width of the flat tape being formed into tube tape, the bottom full-fold guide being in sliding contact with a bottom adhesive side of full-folded tape traveling from the full-fold means towards the cut-off end of the tube-forming base, the bottom full-fold guide and the top full-fold guide being disposed at different heights relative to each other above the tube-forming base, and compression guide means positioned between the bottom full-fold guide and the cut-off end for compressing together the full-folded tape overlapping seams.

14. A tube-tape-forming apparatus as claimed in claim 13 wherein the half-fold means is comprised of:

a tape-entrance guide extended from an entrance-guide support on a first side of the tube-forming base for a distance of at least one-half of a width of the flat tape to be formed into the tubular tape, the tape-entrance guide being in sliding contact-with a non-adhesive side of the flat tape entering the tube-tape-forming apparatus from the feed end of the tube-forming base, and a half-fold guide on the tube-forming base, the half-fold guide having a first U-shaped slot, whereby the flat tape traveling from the first tape-entrance guide is in sliding contact through the first U-shaped slot with the half-fold guide to form laterally half-folded tape.

15. A tube-tape-forming apparatus as claimed in claim 14, wherein the transition-fold means is a transition-fold guide having a transition member and a transition member support, the transition member support being mounted to the tube-forming base, the transition member depending from the transition member support, having an outside periphery and having a size and a shape to form laterally half-folded tape into a looped-folded tape with the adhesive sides of the looped-folded tape in sliding contact with the outside periphery of the transition member as loop-folded tape travels from the half-fold means to the full-fold means.

16. A tube-tape-forming apparatus as claimed in claim 13, wherein the half-fold means is comprised of:

a tape-entrance guide extended from an entrance-guide support on a first side of the tube-forming base for a distance of at least one-half of a width of the flat tape to be formed into the tubular tape, the tape-entrance guide being in sliding contact with a non-adhesive side of the flat tape entering the tube-tape-forming apparatus from the feed end of the tube-forming base, a half-fold guide comprised of the low half-fold member, the intermediate half-fold member and the top half-fold member, the half-fold guide being mounted to the tube-forming base, the half-fold guide positioned between the tape-entrance guide and the transition-fold means and in line in half-folding relationship with flat tape that is in sliding contact with the tape-entrance guide, the low half-fold member having a first upper surface extended from a low half-fold support on a first side of the tube-forming base for a distance of at least one-half of a width of the flat tape, the intermediate half-fold member having a first lower surface, a first end surface and a second upper surface positioned between the low half-fold member and the top half-fold member and extended from the low half-fold support for a distance of at least one-half of a width of the flat tape, the top half-fold member having a second lower surface extended from a top half-fold support on a second side of the tube-forming base for a distance of at least one-half of a width of the flat tape, the low half-fold support having a first inner surface, the top half-fold support having a second inner surface, and the first upper surface of the low half-fold member, the first inner surface of the low half-fold support, the first lower surface, the first end surface and the second upper surface of the intermediate half-fold member, the second inner surface of the top half-fold support and the second lower surface of the top half-fold member defining a first U-shaped slot, whereby the flat tape traveling from the tape-entrance guide is in sliding contact through the first U-shaped slot with the half-fold guide to form laterally half-folded tape.

17. A tube-tape-forming apparatus as claimed in claim 16, wherein the transition-fold means is a transition-fold guide having a transition member and a transition member support, the transition member support being mounted to the tube-forming base, the transition member depending from the transition member support, having an outside periphery and having a size and a shape to form laterally half-folded tape into a looped-folded tape with the adhesive sides of the looped-folded tape in sliding contact with the outside periphery of the transition member as loop-folded tape travels from the half-fold means to the full-fold means.

18. A tube-tape-forming apparatus for forming tubular tape having overlapping seams, comprising:

a tube-forming base having a feed end, a cut-off end and an operative side, the operative side being intermediate the feed end and the cut-off end of the tube forming base;

a half-fold means for forming laterally half-folded tape extending from the operative side at a predetermined distance from the feed end of the tube-forming base, the half-fold means having a top half-fold member, an intermediate half-fold member and a low half-fold member;

a transition-fold means extending from the operative side proximate a center portion of the tube-forming base;

a full-fold means extended from the operative side at a predetermined distance from the cut-off end of the tube-forming base; and the half-fold means further having a tape-entrance guide extended from an entrance-guide support on a first side of the tube-forming base for a distance of at least one-half of a width of the flat tape to be formed into the tubular tape, the tape-entrance guide being in sliding contact with a non-adhesive side of the flat tape entering the tube-tape-forming apparatus from the feed end of the tube-forming base, a half-fold guide having the low half-fold member, the intermediate half-fold member and the top half-fold member, the half-fold guide being mounted to the tube-forming base, the half-fold guide positioned between the tape-entrance guide and the transition-fold means and in line in half-folding relationship with flat tape that is in sliding contact with the tape-entrance guide, the low half-fold member having a first upper surface extended from a low half-fold support on a first side of the tube-forming base for a distance of at least one-half of a width of the flat tape, the intermediate half-fold member having a first lower surface, a first end surface and a second upper surface positioned between the low half-fold member and the top half-fold member and extended from the low half-fold support for a distance of at least one-half of a width of the flat tape, the top half-fold member having a second lower surface extended from a top half-fold support on a second side of the tube-forming base for a distance of at least one-half of a width of the flat tape, the low half-fold support having a first inner surface, the top half-fold support having a second inner surface, and the first upper surface of the low half-fold member, the first inner surface of the low half-fold support, the first lower surface, the first end surface and the second upper surface of the intermediate half-fold member, the second inner surface of the top half-fold support and the second lower surface of the top half-fold member defining a first U-shaped slot, whereby the flat tape traveling from the tape-entrance guide is in sliding contact through the first U-shaped slot with the half-fold guide to form laterally half-folded tape.

19. A tube-tape-forming apparatus as claimed in claim 18 and further comprising the tube-forming base having an edge and a mounting side having a lower end, the lower end connected to the edge of the tube-forming base, wherein the full fold means is comprised of:

a full-fold guide having a low full-fold member, an intermediate full-fold member and a top full-fold member on the tube-forming base, the full-fold guide positioned between the transition-fold means and the cut-off end and in line in full-folding relationship with a looped-folded tape having an adhesive side that is in sliding contact with the transition-fold means, the low full-fold member having a third upper surface extended from a low full-fold support on the second side of the tube-forming base for a distance of at least one-fourth of a width of the flat tape, the intermediate full-fold member having a third lower surface, a second end surface and a fourth upper surface positioned between the low full-fold member and the top full-fold member and extended from the low full-fold support for a distance of at least one-fourth of a width of the flat tape, the top full-fold member having a fourth lower surface extended from a top full-fold support on the first side of the tube-forming base for a distance of at least one-fourth of a width of the flat tape, the low full-fold support having a third inner surface, the top full-fold support having a fourth inner surface, the third upper surface of the low full-fold member, the third inner surface of the low full-fold support, the third lower surface, the second end surface and the fourth upper surface of the intermediate full-fold member, the fourth inner surface of the top full-fold support and the fourth lower surface of the top full-fold member defining a second U-shaped slot, whereby the looped tape traveling from the transition-fold means is in sliding contact through the second U-shaped slot with the full-fold guide to form a full-folded tape having overlapping seams, and a compression guide extended from the mounting side and positioned between the full-fold guide and the cut-off end for compressing together the full-folded tape overlapping seams.

20. A tube-tape-forming apparatus as claimed in claim 18, wherein the transition-fold means is a transition-fold guide having a transition member and a transition member support, the transition member support being mounted to the tube-forming base, the transition member depending from the transition member support, having an outside periphery and having a size and a shape to form laterally half-folded tape into a looped-folded tape with the adhesive sides of the looped-folded tape in sliding contact with the outside periphery of the transition member as looped-folded tape travels from the half-fold means to the full-fold means.

21. A tube-tape-forming apparatus as claimed in claim 20 and further comprising the tube-forming base having an edge and a mounting side having a lower end, the lower end connected to the edge of the tube-forming base, wherein the full fold means is comprised of:

a full-fold guide having a low full-fold member, an intermediate full-fold member and a top full-fold member on the tube-forming base, the full-fold guide positioned between the transition-fold means and the cut-off end and in line in full-folding relationship with a looped-folded tape having an adhesive side that is in sliding contact with the transition-fold means, the low full-fold member having a third upper surface extended from a low full-fold support on a second side of the tube-forming base for a distance of at least one-fourth of a width of the flat tape, the intermediate full-fold member having a third lower surface, a second end surface and a fourth upper surface positioned between the low full-fold member and the top full-fold member and extended from the low full-fold support for a distance of at least one-fourth of a width of the flat tape, the top full-fold member having a fourth lower surface extended from a top full-fold support on a first side of the tube-forming base for a distance of at least one-fourth of a width of the flat tape, the low full-fold support having a third inner surface, the top full-fold support having a fourth inner surface, the third upper surface of the low full-fold member, the third inner surface of the low full-fold support, the third lower surface, the second end surface and the fourth upper surface of the intermediate full-fold member, the fourth inner surface of the top full-fold support and the fourth lower surface of the top full-fold member defining a second U-shaped slot, whereby the looped tape traveling from the transition-fold means is in sliding contact through the second U-shaped slot with the full-fold guide to form a full-folded tape having overlapping seams, and a compression guide extended from the mounting side and positioned between the full-fold guide and the cut-off end for compressing together the full-folded tape overlapping seams.

22. A tube-tape-forming apparatus as claimed in claim 21 and further comprising the compression guide having an upper compression member and a lower compression member and a guide roller rotationally positioned on each of the compression members.

23. A tube-tape-forming apparatus as claimed in claim 21 and further comprising a cut-off blade on the cut-off end of the tube-forming base.

24. A tube-tape-forming apparatus as claimed in claim 23 and further comprising a tape dispenser on the feed end of the tube-forming base.

25. A tube-tape-forming apparatus for forming tubular tape having overlapping seams, comprising:

a tube-forming base having a feed end, a cut-off end, an operative side, an edge and a mounting side, the operative side being intermediate the feed end and the cut-off end of the tube forming base, the mounting side having a lower end, the lower end connected to the edge of the tube-forming base;

a half-fold means extending from the operative side at a predetermined distance from the feed end of the tube-forming base;

a transition-fold means extending from the operative side proximate a center portion of the tube-forming base; and a full-fold means extending from the operative side at a predetermined distance from the cut-off end of the tube-forming base, the full-fold means having a full-fold guide on the tube-forming base, the full-fold guide having a U-shaped slot, whereby the looped-folded tape traveling from the transition-fold means is in sliding contact through the U-shaped slot with the full-fold guide to form a full-folded tape having overlapping seams, and a compression guide extended from the mounting side and positioned between the full-fold guide and the cut-off end for compressing together the full-folded tape overlapping seams.

26. A tube-tape-forming apparatus for forming tubular tape having overlapping seams, comprising:

a tube-forming base having a feed end, a cut-off end, an operative side, an edge and a mounting side, the operative side being intermediate the feed end and the cut-off end of the tube forming base, the mounting side having a lower end, the lower end connected to the edge of the tube-forming base;

a half-fold means extending from the operative side at a predetermined distance from the feed end of the tube-forming base;

a transition-fold means extending from the operative side proximate a center portion of the tube-forming base, the transition-fold means comprises a transition-fold guide having a transition member and a transition member support, the transition member support being mounted to the tube-forming base, the transition member depending from the transition member support, having an outside periphery and having a size and a shape to form laterally half-folded tape into a looped-folded tape with the adhesive sides of the looped-folded tape in sliding contact with the outside periphery of the transition member as looped-folded tape travels from the half-fold means to the full-fold means; and a full-fold means extending from the operative side at a predetermined distance from the cut-off end of the tube-forming base, the full fold means having a full-fold guide on the tube-forming base, the full-fold guide having a U-shaped slot, whereby the looped-folded tape traveling from the transition-fold means is in sliding contact through the U-shaped slot with the full-fold guide to form a full-folded tape having overlapping seams, and a compression guide extended from the mounting side and positioned between the full-fold guide and the cut-off end for compressing together the full-folded tape overlapping seams.

27. A tube-tape-forming apparatus as claimed in claim 26 and further comprising a cut-off blade on the cut-off end of the tube-forming base.

28. A tube-tape-forming apparatus as claimed in claim 27 and further comprising a tape dispenser on the feed end of the tube-forming base.

29. A tube-tape-forming apparatus for forming tubular tape having overlapping seams, comprising:

a tube-forming base having a feed end, a cut-off end, an operative side, an edge and a mounting side, the operative side being intermediate the feed end and the cut-off end of the tube forming base, the mounting side having a lower end, the lower end connected to the edge of the tube-forming base;

a half-fold means extending from the operative side at a predetermined distance from the feed end of the tube-forming base;

a transition-fold means extending from the operative side proximate a center portion of the tube-forming base; and a full-fold means extending from the operative side at a predetermined distance from the cut-off end of the tube-forming base, the full-fold means having a full-fold guide having a low full-fold member, an intermediate full-fold member and a top full-fold member on the tube-forming base, the full-fold guide positioned between the transition-fold means and the cut-off end and in line in full-folding relationship with a looped-folded tape having an adhesive side that is in sliding contact with the transition-fold means, the low full-fold member having a third upper surface extended from a low full-fold support on a second side of the tube-forming base for a distance of at least one-fourth of a width of the flat tape, the intermediate full-fold member having a third lower surface, a second end surface and a fourth upper surface positioned between the low full-fold member and the top full-fold member and extended from the low full-fold support for a distance of at least one-fourth of a width of the flat tape, the top full-fold member having a fourth lower surface extended from a top full-fold support on a first side of the tube-forming base for a distance of at least one-fourth of a width of the flat tape, the low full-fold support having a third inner surface, the top full-fold support having a fourth inner surface, the third upper surface of the low full-fold member, the third inner surface of the low full-fold support, the third lower surface, the second end surface and the fourth upper surface of the intermediate full-fold member, the fourth inner surface of the top full-fold support and the fourth lower surface of the top full-fold member defining a second U-shaped slot, whereby the looped tape traveling from the transition-fold means is in sliding contact through the second U-shaped slot with the full-fold guide to form a full-folded tape having overlapping seams, and a compression guide extended from the mounting side and positioned between the full-fold guide and the cut-off end for compressing together the full-folded tape overlapping seams.

30. A tube-tape-forming apparatus for forming tubular tape having overlapping seams, comprising:

a tube-forming base having a feed end, a cut-off end, an operative side, an edge and a mounting side, the operative side being intermediate the feed end and the cut-off end of the tube forming base, the mounting side having a lower end, the lower end connected to the edge of the tube-forming base;

a half-fold means extending from the operative side at a predetermined distance from the feed end of the tube-forming base;

a transition-fold means extending from the operative side proximate a center portion of the tube-forming base, the transition-fold means comprises a transition-fold guide having a transition member and a transition member support, the transition member support being mounted to the tube-forming base, the transition member depending from the transition member support, having an outside periphery and having a size and a shape to form laterally half-folded tape into a looped-folded tape with the adhesive sides of the looped-folded tape in sliding contact with the outside periphery of the transition member as looped-folded tape travels from the half-fold means to the full-fold means; and a full-fold means extending from the operative side at a predetermined distance from the cut-off end of the tube-forming base, the full fold means having a full-fold guide having a low full-fold member, an intermediate full-fold member and a top full-fold member on the tube-forming base, the full-fold guide positioned between the transition-fold means and the cut-off end and in line in full-folding relationship with a looped-folded tape having an adhesive side that is in sliding contact with the transition-fold means, the low full-fold member having a third upper surface extended from a low full-fold support on a second side of the tube-forming base for a distance of at least one-fourth of a width of the flat tape, the intermediate full-fold member having a third lower surface, a second end surface and a fourth upper surface positioned between the low full-fold member and the top full-fold member and extended from the low full-fold support for a distance of at least one-fourth of a width of the flat tape, the top full-fold member having a fourth lower surface extended from a top full-fold support on a first side of the tube-forming base for a distance of at least one-fourth of a width of the flat tape, the low full-fold support having a third inner surface, the top full-fold support having a fourth inner surface, the third upper surface of the low full-fold member, the third inner surface of the low full-fold support, the third lower surface, the second end surface and the fourth upper surface of the intermediate full-fold member, the fourth inner surface of the top full-fold support and the fourth lower surface of the top full-fold member defining a U-shaped slot, Whereby the looped tape traveling from the transition-fold means is in sliding contact through the U-shaped slot with the full-fold guide to form a full-folded tape having overlapping seams, and a compression guide extended from the mounting side and positioned between the full-fold guide and the cut-off end for compressing together the full-folded tape overlapping seams.

31. A tube-tape-forming apparatus for forming tubular tape having overlapping seams, comprising:

a tube-forming base having a feed end, a cut-off end and an operative side, the operative side being intermediate the feed end and the cut-off end of the tube forming base;

a half-fold means extending from the operative side at a predetermined distance from the feed end of the tube-forming base, the half-fold means comprising a tape-entrance guide extended from an entrance-guide support on a first side of the tube-forming base for a distance of at least one-half of a width of the flat tape to be formed into the tubular tape, the tape-entrance guide being in sliding contact with a non-adhesive side of the flat tape entering the tube-tape-forming apparatus from the feed end of the tube-forming base, and a half-fold guide on the tube-forming base, the half-fold guide having a first U-shaped slot, whereby the flat tape traveling from the first tape-entrance guide is in sliding contact through the first U-shaped slot with the half-fold guide to form laterally half-folded tape;

a transition-fold means extending from the operative side proximate a center portion of the tube-forming base, the transition-fold means comprising a transition-fold guide having a transition member, the transition member having an outside periphery, being extended from the tube-forming base and having a size and a shape to form laterally half-folded tape into a looped-folded tape with the adhesive sides of the looped-folded tape in sliding contact with the outside periphery of the transition member as looped-folded tape travels from the half-fold means to the full-fold means; and a full-fold means extending from the operative side at a predetermined distance from the cut-off end of the tube-forming base.

\* \* \* \* \*